US009251050B2

(12) United States Patent
Baldwin et al.

(10) Patent No.: US 9,251,050 B2
(45) Date of Patent: Feb. 2, 2016

(54) APPARATUS AND METHOD FOR RESOURCE ALERTS

(71) Applicant: International Business Machines Corporation, Armonk, NY (US)

(72) Inventors: Duane M. Baldwin, Mantorville, MN (US); Clodoaldo Barrera, Morgan Hill, CA (US); Sandeep R. Patil, Pune (IN); Riyazahamad M. Shiraguppi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 13/801,066

(22) Filed: Mar. 13, 2013

(65) Prior Publication Data

US 2014/0281330 A1 Sep. 18, 2014

(51) Int. Cl.
*G06F 13/00* (2006.01)
*G06F 13/28* (2006.01)
*G06F 12/02* (2006.01)
*G06F 11/30* (2006.01)
*G06F 9/50* (2006.01)

(52) U.S. Cl.
CPC ............... *G06F 12/023* (2013.01); *G06F 9/50* (2013.01); *G06F 11/3034* (2013.01); *G06F 11/3037* (2013.01); *G06F 11/3055* (2013.01)

(58) Field of Classification Search
CPC ............ G06F 11/3034; G06F 11/3037; G06F 11/3055; G06F 12/023; G06F 9/5016
See application file for complete search history.

(56) References Cited

U.S. PATENT DOCUMENTS

| | | | |
|---|---|---|---|
| 7,263,578 B2 | 8/2007 | Kano | |
| 7,590,666 B2 | 9/2009 | Korman et al. | |
| 7,904,689 B1* | 3/2011 | Carothers | ..................... 711/170 |
| 7,949,847 B2 | 5/2011 | Murase | |
| 8,171,241 B2 | 5/2012 | Nagai et al. | |
| 2006/0242378 A1 | 10/2006 | Kano | |
| 2007/0043923 A1* | 2/2007 | Shue | ............................. 711/170 |
| 2009/0240809 A1 | 9/2009 | La Frese et al. | |
| 2010/0262802 A1 | 10/2010 | Goebel et al. | |
| 2011/0208931 A1 | 8/2011 | Pendharkar et al. | |
| 2011/0314193 A1 | 12/2011 | Kaneda et al. | |
| 2012/0054438 A1 | 3/2012 | Kawaguchi | |
| 2012/0078846 A1 | 3/2012 | Gold et al. | |

OTHER PUBLICATIONS

Dufrasne, et al., "DS800 Thin Provisioning," IBM Redbooks, Oct. 27, 2009, pp. 1-106 (http://www.redbooks.ibm.com/abstracts/redp4554.html).

* cited by examiner

*Primary Examiner* — Edward Dudek, Jr.
(74) *Attorney, Agent, or Firm* — Dale F. Regelman; Quarles & Brady LLP

(57) ABSTRACT

A method of managing resource allocations in a storage system provisioning system, including monitoring write applications that result in new storage block allocations during a current time slice, calculating a time remaining to exceed actual capacity of allocated storage blocks, if the calculated remaining time does exceed length of next time slice immediately transmitting an alert when an estimated number of future write requests exceeds a predetermined threshold, and if the calculated remaining time does exceed length of next time slice immediately transmitting an alert when an estimated number of future write requests exceeds a predetermined threshold, wherein a duration of a time slice is set by a storage system administrator based upon a current storage library setup and a time required to arrange a new storage device when a thin provisioning device is going out of disk space.

24 Claims, 10 Drawing Sheets

FIG. 5

| BYTE\BIT | 7 | 6 | 5 | 4 | 3 | 2 | 1 | 0 |
|---|---|---|---|---|---|---|---|---|
| 0 | OPERATION CODE (8Ah) ||||||||
| 1 | WRPROTECT ||| DPO | FUA | RESERVED | FUA_NV | RESERVED |
| 2 | (MSB) LOGICAL BLOCK ADDRESS ||||||||
| 9 | LOGICAL BLOCK ADDRESS (LSB) ||||||||
| 10 | (MSB) TRANSFER LENGTH ||||||||
| 13 | TRANSFER LENGTH (LSB) ||||||||
| 14 | RESTRICTED FOR MMC-4 || RESERVED ||| GROUP NUMBER |||
| 15 | CONTROL ||||||||

APPARATUS AND METHOD FOR RESOURCE ALERTS

FIELD OF THE INVENTION

The invention relates to an apparatus and method to provide resource alerts. In certain embodiments, the invention is directed to generating intelligent alerts relating to utilization of shared resources.

BACKGROUND OF THE INVENTION

Data storage systems are used to store large amounts of information received from one or more sources. A data storage system often comprises a storage controller in communication with one or more clients, often referred to as "hosts," and also in communication with a plurality of data storage devices. A host computing device may send a storage controller a write command to write certain information to a data storage medium, and/or a read command to read information from a data storage medium, and/or a copy command to copy information from one data storage medium to another data storage medium. Host computers may also provide commands to a storage controller to establish or revise physical and/or logical configurations. In certain embodiments, a read command, or a write command, or a copy command, or a configuration command comprises a plurality of objects packaged in one command Many storage systems include a number of different storage devices, each arranged in a number of tiers. The storage devices and associated tiers are arranged to provide different performance characteristics. For example, a high performance tier of a particular storage system may include a number of solid state disks (SSDs) that provide short seek times. Because SSDs can be relatively expensive, the storage system may also include a lower performance tier made up of a number of slower devices, such as Serial Advanced Technology Attachment (SATA) drives. Although the SATA drives provide higher seek times, they can be a more inexpensive way to store data than additional SSD drives.

In some implementations, the physical storage resources available to a particular storage system can be distributed as part of an environment in which client devices are allocated a certain number of virtual resources. Those virtual resources are then mapped to a physical resource. Virtualization technology provides the appearance of more physical resources (e.g., storage devices) than are actually available to the client.

SUMMARY OF THE INVENTION

A method of managing resource allocations is presented. The method monitors write applications that result in new storage block allocations during a current time slice, calculates a time remaining to exceed actual capacity of allocated storage blocks, and immediately transmits an alert if the calculated remaining time does not exceed length of next time slice. In certain embodiments, the duration of a time slice is defined by a storage system administrator. In certain embodiments, the duration, i.e. size, of a time slice is based upon a current storage library setup. In certain embodiments, the duration of a time slice is set to allow sufficient time for a storage system administer to take action to configure a new data storage device when a thin provisioning storage device is going out of disk space, i.e. running out of additional storage capacity.

An article of manufacture comprising a processor and a non-transitory data storage medium comprising computer readable program code encoded therein to manage resource allocations is presented. The computer readable program code causes the processor to monitor write applications that result in new storage block allocations during a current time slice, calculate a time remaining to exceed actual capacity of allocated storage blocks, and transmit an alert if the calculated remaining time does not exceed length of next time slice.

BRIEF DESCRIPTION OF THE DRAWINGS

The invention will be better understood from a reading of the following detailed description taken in conjunction with the drawings in which like reference designators are used to designate like elements, and in which:

FIG. 5 illustrates exemplary header information for a SCSI write command that may be used for storing an application ID;

DETAILED DESCRIPTION OF THE PREFERRED EMBODIMENTS

Figure 1:
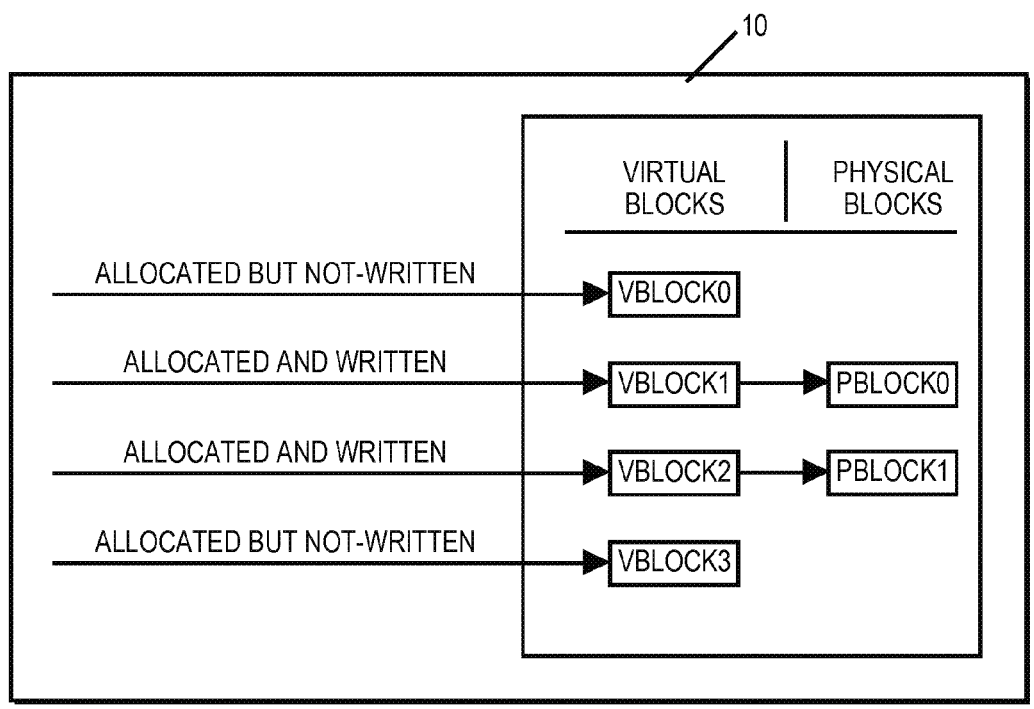
FIG. 1 illustrates an allocation of virtual and physical data storage blocks.

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Applicants' devices use virtualization technology to provide the appearance of more physical resources (e.g., storage devices) than are actually available to the client. For example, 10 GB of storage space may be allocated for each user (or, alternatively, each application), but the average use amongst those users may be no more than 6 GB. In that case, in excess of 40% of storage space available to the client will not be in use at any point of time. As such, even though 10 GB is allocated or made available to each user, the client requires only 6 GB of physical storage per user. Of course, the requirement for physical storage space could increase should the average amount of data stored per user increase beyond 6 GB.

Certain storage systems, such as IBM's DS8000, are configured to allocate storage space to clients on an as-needed basis, thereby minimizing the amount of un-used physical storage media allocated to a particular client. Accordingly, the provisioning systems allocate storage blocks only in response to a client's storage needs, rather than by traditional methods of allocating all storage blocks to a client up-front (i.e., before the blocks are even in use). In the example given above, a provisioning system could allocate each user 10 GB in virtual storage blocks, but only store 6 GB of data in physical blocks. As such, each user appears to have 10 GB of storage space available, but the system has only allocated a minimum amount of physical storage to the client.

To enable provisioning systems to track the number of allocated virtual blocks and their associated physical blocks for a particular client, the provisioning system maintains a table of virtual blocks allocated for use by applications on the client. If a write operation has been performed to a particular virtual block (i.e., the client has stored data on that virtual block), the table identifies the physical storage block to which the data was actually written. Conversely, if no data has been written to a particular virtual block, the table does not identify a physical storage block for that virtual block (as none has been assigned).

FIG. 1, for example, is an illustration showing the allocation of virtual and physical data storage blocks within provisioning system 10. As illustrated, provisioning system 10 has allocated four virtual blocks (Vblock0, Vblock1, Vblock2, Vblock3) for use by a particular client or an application running on the client. Virtual storage blocks Vblock0 and Vblock3 have been allocated, but no data has been stored thereto. Accordingly, virtual storage blocks Vblock0 and Vblock3 are available to the client but are not associated with any physical storage block (and, therefore, are not consuming physical resources). In contrast, the client has stored data to each of virtual blocks Vblock1 and Vblock2 and, as such, physical storage blocks PBlock0 and PBlock1 are assigned to Vblock1 and Vblock2. Physical storage blocks PBlock0 and PBlock1 store the data associated with virtual blocks Vblock1 and Vblock2, respectively.

In provisioning systems, it is possible that the physical storage medium may become over-allocated. For example, if two clients are each allocated 10 GB of virtual storage space, but historically have only used 6 GB of space, those clients may only be provided a total of 12 GB of physical storage space. If, however, the actual storage space usage on either of the clients increases greatly, the clients may require additional storage (i.e., up to a total of 20 GB of physical storage space, should each client use 100% of allocated virtual storage resources). If the amount of physical storage becomes over-allocated, the clients will generate errors as they attempt to store data into resources that are not available. As a result, many provisioning services provide mechanisms to warn system administrators when physical storage resources are becoming over allocated. These warnings allow the system administrators to provide additional physical resources as they become needed.

For example, a particular provisioning system may allow the system administrator to define a threshold specifying a minimum amount of available physical storage capacity. If the available free space on that physical storage medium drops below the threshold value, warnings are sent to the system administrator (e.g., via an SNMP message). The administrator is then expected to take appropriate action. The action may include allocating new storage devices or relocating some application input/outputs from a given provisioning device to another.

These alerts systems, though, have some deficiencies. For example, the alerts do not provide any information to the system administrator regarding how urgently the administrator must take action. If a particular application's write allocation behavior is very fast and if the administrator does not take immediate action, some of the client's applications may generate out of space errors before the additional physical resources are made available. These errors can lead to undesirable consequences in the application environment as an application may conclude it is experiencing a hardware crash or disk corruption.

In some cases, the administrator can be afforded more time to take action by lowering the threshold value that generates alerts. However, the lower threshold value will result in an increased number of false alerts where the threshold is exceeded, but only momentarily.

Additionally, existing alert methods do not provide any information regarding which applications are primarily responsible for generating warnings. After receiving an alert, the administrator is usually expected to take appropriate action that may include allocating a new physical storage device for future input/outputs or redirecting the input/outputs of a particular application so that new input/outputs for the application will go to new storage device that has ample capacity. Accordingly, the administrator is required to know which applications are heavily allocating new blocks so that the input/output for those applications can be redirected to a new device while other applications can continue with the existing provisioning device. In conventional systems, when generating alerts, prior art provisioning devices do not provide any information regarding which applications are aggressively writing new blocks.

Figure 2:
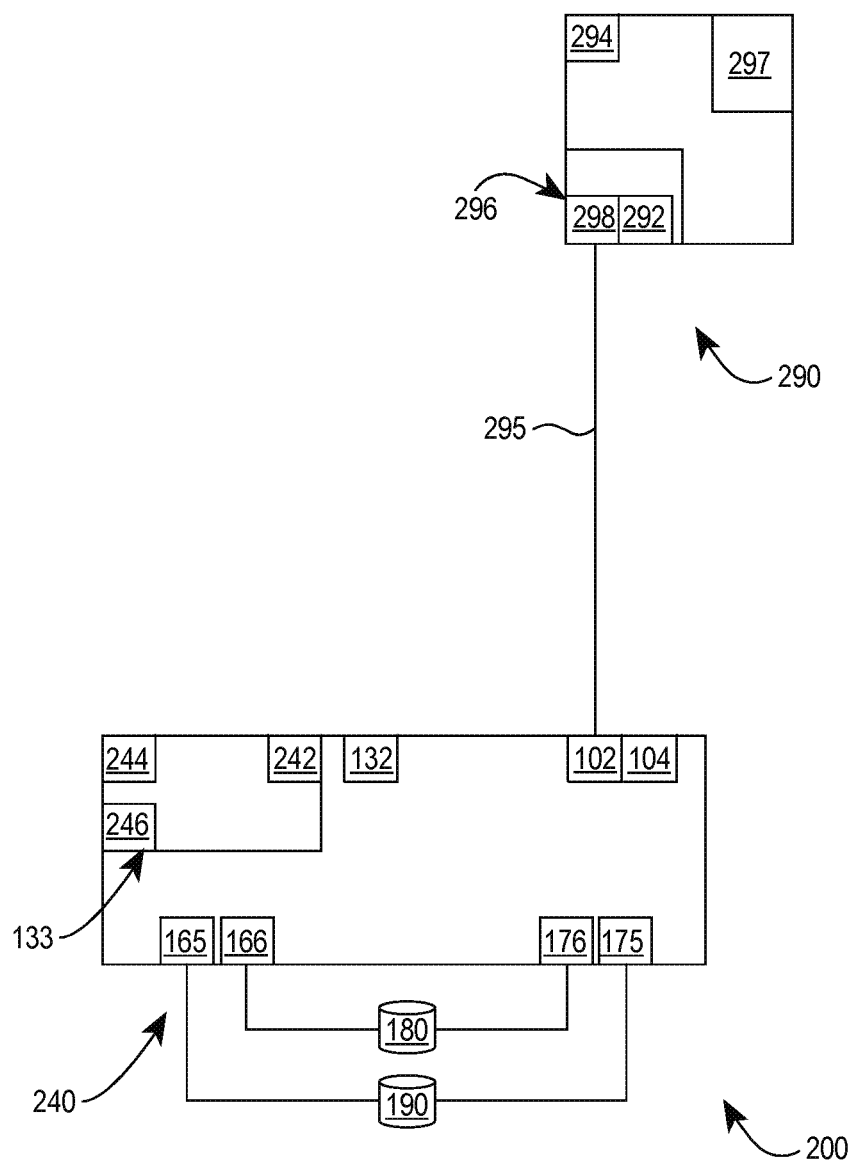
FIG. 2 is a block diagram showing a host computer in communication with a storage controller.

In accordance with the present disclosure, FIG. 2 depicts an example storage system that may be provided as part of a provisioning environment. Data storage system 200 includes storage controller 240 which interconnects a plurality of data storage drives 180 and/or a plurality of data storage drives 190, with a computing device 290. Storage controller 240 comprises a processor 132 and computer readable memory 133, instructions 242 written to computer readable memory 133, a plurality of supported, i.e. enabled, commands 244 written to computer readable memory 133, and a plurality of supported, i.e. enabled, command parameters 246 written to computer readable memory.

In certain embodiments, storage controller 240 communicates with the plurality of data storage devices 180 via device adapters 165 and 175, and with plurality of data storage devices 190 via device adapters 166 and 176, using an I/O protocol such as SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, or SATA (Serial ATA).

In the illustrated embodiments of FIG. 2, computing device 290 comprises a processor 294 and computer readable medium 296, wherein instructions 298 are encoded in computer readable medium 296. In the illustrated embodiments of FIG. 2, computing device 290 further comprises application 297. In certain embodiments, application 297 comprises a storage management program to manage the transfer of data to and from a data storage controller. In certain embodiments, that storage management program may include the functionality of the IBM DFSMS implemented in the IBM zOS operating system.

In certain embodiments, computing device 290 comprises a host computer, wherein that host computer generates data, and provides that data to storage controller 240. Storage controller 240 writes that data to one or more of a plurality of data storage devices 180 and/or 190. Further in the illustrated embodiment of FIG. 2, storage controller 240 is in communication with one host computer 290. In other embodiments, storage controller 240 is in communication with a plurality of host computers. As a general matter, hosts computers 390 includes a computing device, such as a mainframe, personal computer, workstation, and combinations thereof, including an operating system such as Windows, AIX, Unix, zOS, LINUX, etc.

Figure 3:
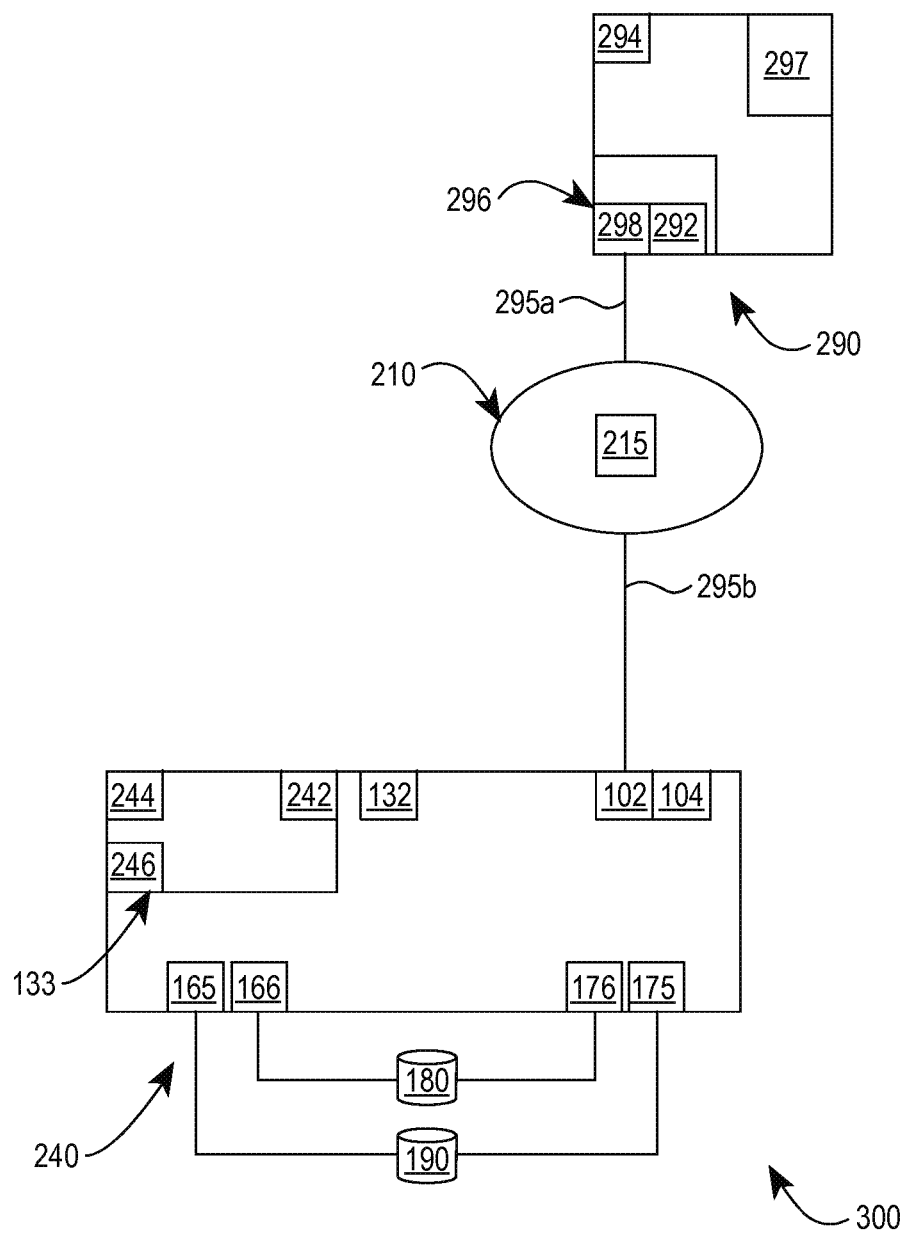
FIG. 3 is a block diagram showing a host computer and a storage controller communicating with one another via a fabric.

FIG. 3 shows the host computer and storage controller of FIG. 2 where host computer 290 and storage controller 240 communicate with one another via fabric 210. In certain embodiments, fabric 210 includes, for example, one or more Fibre Channel ("FC") switches 215. In certain embodiments, those one or more switches 215 include one or more conventional router switches. In the illustrated embodiment of FIG. 3, one or more switches 215 interconnect host computer 290 to storage controller 240 via communication paths 295a and 295b using any type of I/O interface, for example, FC, Infiniband, Gigabit Ethernet, Ethernet, TCP/IP, iSCSI, SCSI I/O interface, or one or more signal lines used by FC switch 215 to transfer information through, to, and from storage controller 240, and subsequently the plurality of data storage devices 180 and/or 190.

In the illustrated embodiments of FIGS. 2 and 3, host computer 290 is interconnected to host adapter 102 disposed in storage controller 240 via communication link 295. The illustrated embodiment of FIG. 2 shows host computer 290 interconnected with storage controller 240 via one communication link. The illustrated embodiment of FIG. 3 shows host computer 290 interconnected with fabric 210 via one communication link. In other embodiments, host computer 290 is interconnected with storage controller 240/fabric 210 with more than one communication link. In certain embodiments, communication link 295 may be configured to comprise up to 256 logical communication paths.

Figure 4:
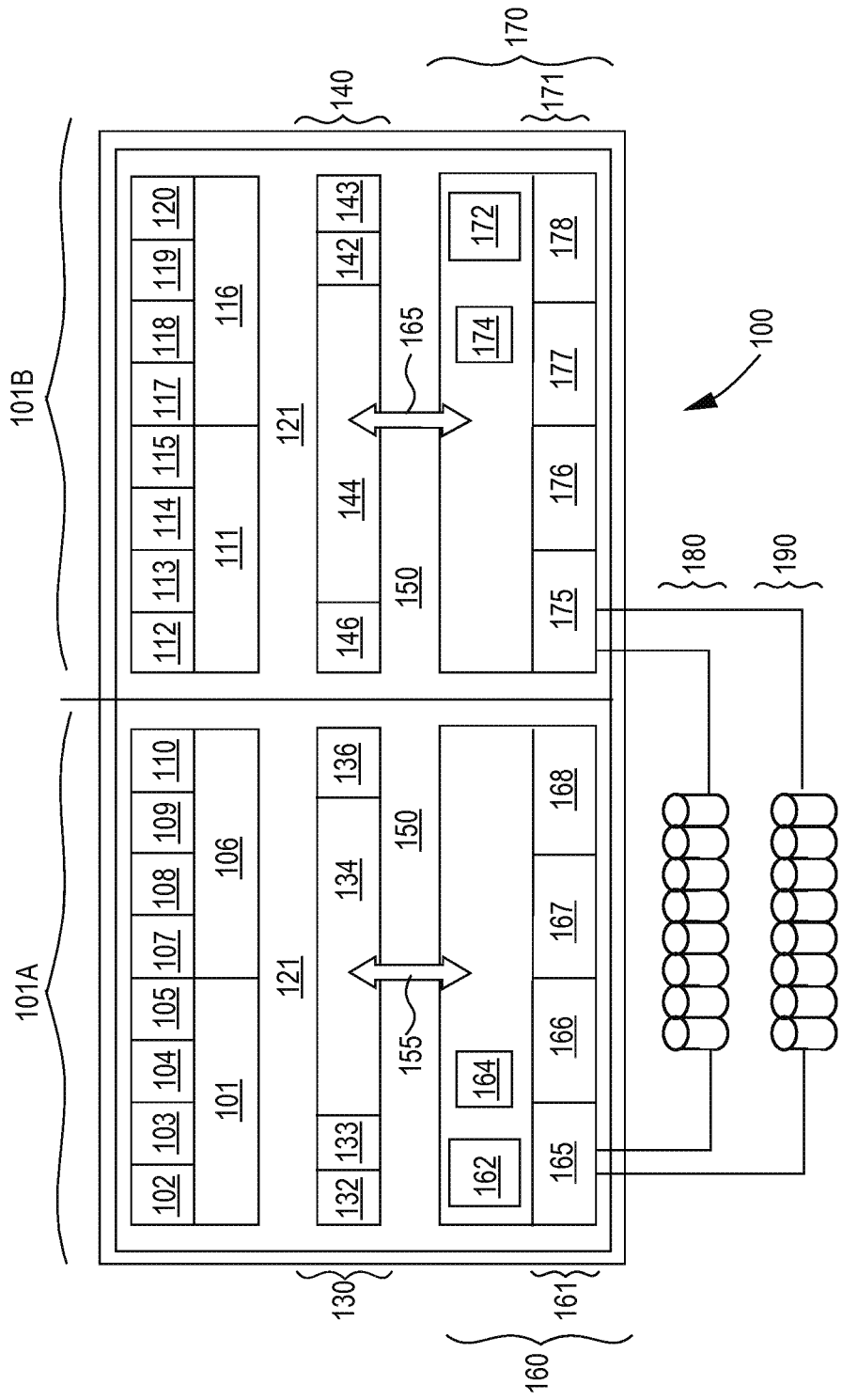
FIG. 4 is a block diagram showing one embodiment of Applicants' storage controller.

Referring now to FIG. 4, in certain embodiments, storage controller 240 comprises a data storage library, such as for example and without limitation, data storage library 100. In certain implementations, data storage library 100 includes a first cluster 101A and a second cluster 101B, wherein clusters 101A and 101B are disposed in the same housing. In the illustrated implementation of FIG. 4, data storage library 100 includes a plurality of host adapters 102-105, 107-110, 112-115, and 117-120, disposed in four host bays 101, 106, 111, and 116. In other implementations, data storage system includes fewer than 16 host adapters. Regardless of the number of host adapters disposed in any implementations of the system, each of those host adapters includes a shared resource that have equal access to both central processing/cache elements 130 and 140.

Each host adapter may comprise any kind of I/O interface. Each host adapter is connected to both clusters 101A and 101B through interconnect bus 121 such that each cluster can handle I/O from any host adapter, and such that the storage controller portion of either cluster can monitor the communication path error rate for every communication path, physical and/or logical, interconnected with data storage library 100.

Storage controller portion 130 includes processor 132, computer readable medium 133, cache 134, and nonvolatile storage ("NVS") 136. In certain implementations, computer readable medium 133 includes random access memory. In certain implementations, computer readable medium 133 includes non-volatile memory.

Storage controller portion 140 includes processor 142, computer readable medium 143, cache 144, and NVS 146. In certain embodiments, computer readable medium 143 includes random access memory. In certain embodiments, computer readable medium includes non-volatile memory.

I/O portion 160 includes a plurality of device adapters, such as device adapters 165, 166, 167, and 168. I/O portion 170 further includes a plurality of device adapters, such as device adapters 175, 176, 177, and 178.

In certain embodiments of the system, one or more host adapters, storage controller portion 130, and one or more device adapters, are packaged together on a single card disposed in the data storage system. Similarly, in certain embodiments, one or more host adapters, storage controller portion 140, and one or more device adapters, are disposed on another card disposed in the data storage system. In these embodiments, system 100 includes two cards interconnected with a plurality of data storage devices.

In the illustrated embodiment of FIG. 4, sixteen data storage devices are organized into two arrays. In other embodiments, the data storage system includes more than two storage device arrays. In certain embodiments, each storage array appears to a host computer as one or more logical devices.

In certain embodiments, arrays 180 and/or 190 utilize a RAID (Redundant Array of Independent Disks) protocol. In certain embodiments, arrays 180 and/or 190 include what is sometimes called a JBOD array, i.e. "Just a Bunch Of Disks" where the array is not configured according to RAID. As those skilled in the art will appreciate, a RAID rank includes independent disk drives configured in an array of disk drives to obtain performance, capacity and/or reliability that exceeds that of a single large drive.

Arrays 180 and/or 190 (and any other attached arrays of storage devices) may provide different tiers of storage devices within the data storage system. Depending upon the particular storage devices incorporated into an array and their particular configuration, the different tiers of a data storage system can provide varying performance characteristics. One tier, for example, may be a high-performance tier providing fast seek times and large bandwidth, but only limited storage capacity. A second tier may provide lower performance, due to its use of slower storage devices, but increased storage capacity.

The present storage system implements a provisioning environment configured to allocate storage resources to clients. The clients are allocated virtual resources that are mapped by a provisioning system to physical resources. As discussed above, in such an environment the physical resources could become over-allocated if one or more applications running on the clients begins allocating data to too many virtual storage blocks. To prevent such an occurrence, the present system monitors both virtual and physical resource usage and provides a warning to a system administrator should a particular resource near over-allocation.

The provisioning system of the present system is aware of and monitors the activities of applications implemented by a client during a number of different time slices.

In certain embodiments, the duration of a time slice is defined by a storage system administrator. In certain embodiments, the duration, i.e. size, of a time slice is based upon a current storage library setup. In certain embodiments, the duration of a time slice is set to allow sufficient time for a storage system administer to take action to configure a new data storage device when a thin provisioning storage device is going out of disk space, i.e. running out of additional storage capacity.

The captured data can then be use to calculated a time remaining until the system's physical capacity is exceeded and identify applications that are aggressively consuming available resources. As such, alerts can be raised in advance if the provisioning system determines a likelihood of exceeding physical space capacity within a particular period. Alternatively, alerts can be raised when the physical capacity utilization exceeds a particular predetermined threshold. In certain embodiments, the duration of a time slice is set by a storage system administrator to allow sufficient time to manage new storage requests.

The provisioning system is configured to monitor application allocation and deallocation behavior and generate intelligent alerts based upon that behavior. The alerts can include information describing an estimated remaining time before physical storage capacity is exceeded as well as a list of applications currently performing new write allocation aggressively. The system, therefore, allows a system administrator to determine how quickly to allocate new physical capacity and which application input/outputs created the need for that new capacity.

During operation of the system, data allocation or write requests include an identification (ID) tag identifying the application issuing the request. The provisioning system monitors write requests within a given time period that result in an allocation of new physical blocks for a number of different applications. During the given time slice, per-application new allocation counts are maintained along with overall allocation counts. Historical data in the form of allocation statistics for past fixed time periods are also maintained. Based upon the new resource allocations occurring in the present time slice, as well as historical allocation information, an allocation requirement for the next time slice can be estimated. A number of different approaches can be used for estimating future allocation requirements. In one implementation sophisticated prediction formulas, such as the Levinson-Durbin algorithm, can be used to analyze historical allocation data to predict future requirements.

If the estimated allocation requirement will exceed capacity thresholds, alerts will be generated in advance. Alternatively, alerts can be raised when capacity thresholds are exceeded as per existing alert mechanisms.

While generating alerts, the present system determines a time remaining before physical storage capacity is exceeded using device-wide allocation counts for a given time slice and historical allocation data information. Additionally, per-application information is consulted to identify a list of applications that are aggressively performing write allocations. Alerts generated by the system, therefore, can provide additional information in the form of remaining time left to exceed capacity as well as a list of applications currently performing new write allocation aggressively.

To monitor the client's usage of virtual blocks and the mapping of used virtual blocks to physical blocks, the provisioning system maintains a block mapping table. The mapping table includes a listing of all assigned virtual blocks. The status for each virtual block is also stored. For virtual blocks that are not allocated (i.e., have a status of 'Freed'), no physical block is listed. But for those virtual blocks that are allocated (i.e., have a status of 'Allocated'), the corresponding physical block is identified. In some implementations, rather than explicitly store the status of each virtual block, the status is inferred from whether a physical block has been allocated and, as a result, listed within the mapping table. If a physical block has been listed, then the corresponding virtual block is presumed to have a status of 'Allocated.' Conversely, if a physical block has not been listed, then the corresponding virtual block is presumed to have a status of 'Freed.' An example table for storing the mapping of virtual block to physical block is shown below in Table 1.

TABLE 1

| Virtual Block | Status | Physical Block |
| --- | --- | --- |
| VBlock0 | Allocated | PBlock0 |
| VBlock1 | Allocated | PBlock 1 |
| VBlock2 | Allocated | — |
| VBlock3 | Allocated | — |
| VBlock 4 | Freed | — |
| VBlock 5 | Freed | — |

When a virtual block is written to for the first time, the status of the virtual block is updated to 'Allocated' and the identification of the physical block assigned to the virtual block is entered into the mapping table. As shown in the Table 1, VBlock0, VBlock1, VBlock2 and VBlock3 are allocated but physical blocks are assigned only for VBlock0 and VBlock1.

As described above, the provisioning system also monitors the usage and allocation of virtual blocks within distinct time slices (e.g., periods of time). A time slice can be of any predetermined duration. In certain embodiments, a time slice is about 1 hour. In certain embodiments, a time slice is about 3 hour. In certain embodiments, a time slice is about the length of 1 business day.

For each time slice, the provisioning system monitors block allocations for a number of different applications running on a client.

The capture of this time slice data is governed by three variables. A first variable, MaxTimeSlice, determines for how many prior time slices data will be stored. A second variable, NoOfApplicationPerTimeSlice, determines the maximum number of applications for which virtual block allocations will be monitored for each time slice. Finally, a third variable, CurrentTimeSliceNo, is a variable that stores an identifier that uniquely identifies the current time slice being monitored. Table 2, below, shows an example table storing time slice data.

TABLE 2

| TimeSliceNo | ApplicationID | AllocationCount |
|---|---|---|
| 0 | 1 | 100 |
| 0 | 2 | 200 |
| 0 | 3 | 10 |
| 1 | 1 | 200 |
| 1 | 3 | 20 |
| 1 | 4 | 100 |
| 2 | 1 | 300 |
| 2 | 2 | 100 |
| 2 | 3 | 10 |
| 3 | 2 | 200 |
| 3 | 4 | 100 |
| 3 | 5 | 300 |

As shown, the time slice data table includes time slice data for a number of different time slices (i.e., time slices 0-3) and for a number of different applications (i.e., application IDs 1-5). The different application IDs may represent database applications, file server applications, etc. For each combination of time slice and application, the table stores the number of new write allocations that resulted in the allocation of a new physical block (see column 'AllocationCount'). Accordingly, in a given time slice the table can be used to determine the number of new write allocations that have been caused by a particular application, where the allocation resulted in the allocation of a new physical block.

In the example shown in Table 2, the size of the time slice data table is dependant on the MaxTimeSlice and NoOfApplicationPerTimeSlice variable values. The table can be maintained in the form of circular queue where CurrentTimeSliceNo specifies a time slice number for the current time slice and historical data will be maintained in a circular manner. The table can be created upon initialization of a provisioning device. The table will then be updated when, for the current time slice, an application write instruction results in the allocation of a new physical block within the provisioning device.

When storing the data within Table 2, it is necessary that the provisioning device be able to accurately identify the application that is responsible for a particular allocation request. Although many different mechanisms may be used to uniquely identify the application, one approach is to use information communicated using the small computer systems interface (SCSI) protocol to identify the responsible application. FIG. 5, for example, shows the header information for a SCSI write command. As illustrated, the header includes a number of reserved bits (including Byte 14 (bit-5, bit-6) and Byte 1 (bit 2)) that may be used for storing an application ID. By using these reserved bits, 8 application IDs may be stored in write commands issued by a client to a provisioning system. If there is a need to store application IDs for a greater number of applications, SCSI extended command descriptor block (CDB) can be used. The application ID of a particular application can be assigned by the client's operating system based upon the number of applications accessing the provisioning device.

For any application write request, the client's operation system or driver can be configured to inject the appropriate application ID into the write header using these reserved bits. The application ID can then be passed to the provisioning system as part of the write command. As discussed earlier, however, many alternative techniques can be used to identify the application issuing a write request to the provisioning system.

During operation, the provision system uses both the block mapping table and time slice data table to monitor resource allocations and generate alerts when it is anticipated that physical resources available to the provisioning system are approaching levels of over-utilization.

Figure 6:
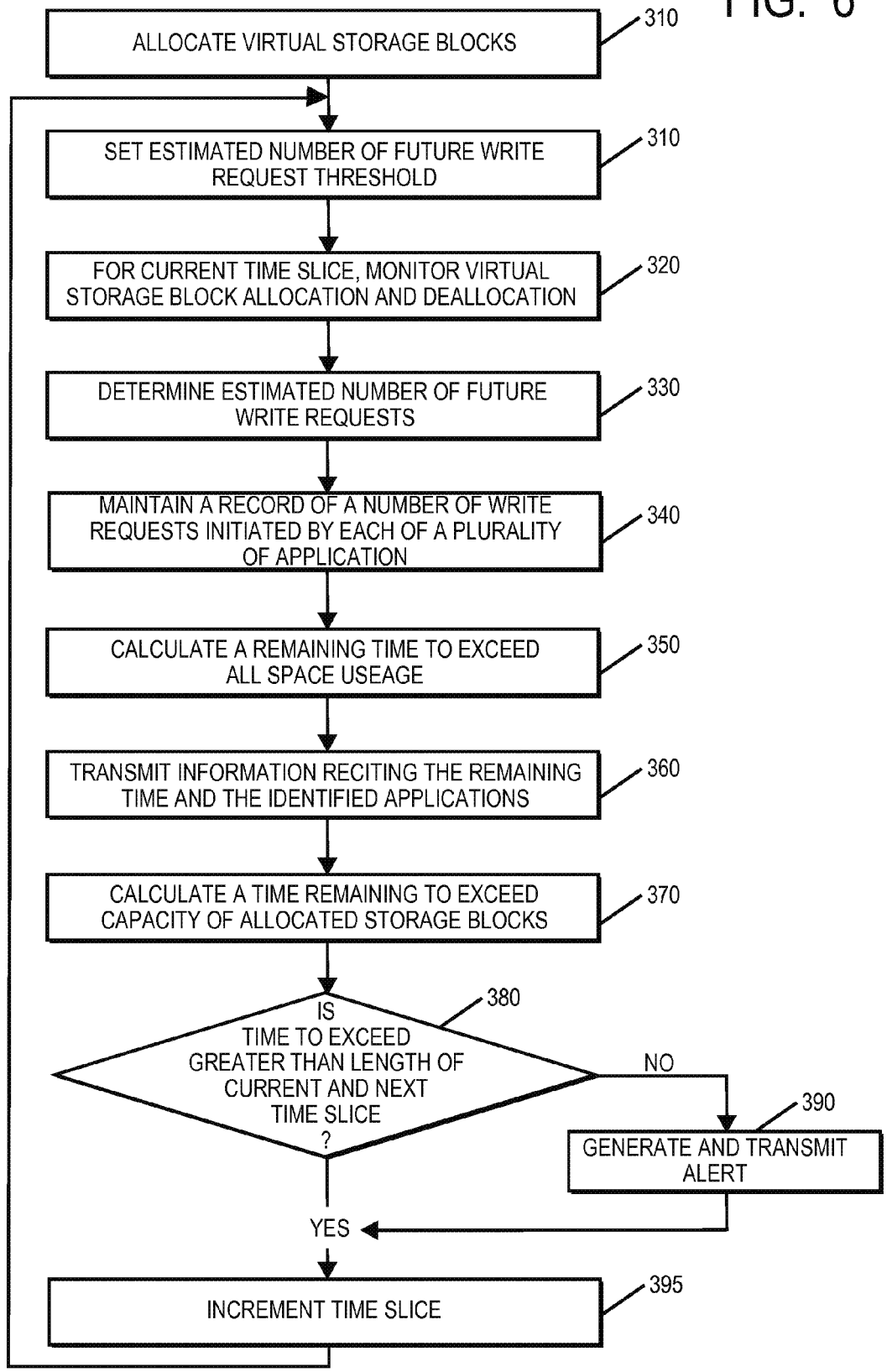
FIG. 6 is a flowchart illustrating a method for provisioning of resources.

Before operation of the provisioning system, the provisioning system allocates a particular number of virtual blocks for data storage. Then, according to the methods described below, the provisioning system monitors the client's usage of those virtual blocks. This involves monitoring the clients writing data to virtual blocks, as well as the client's deallocation of virtual blocks. FIG. 6 is a flowchart showing high-level method 300 of the present provisioning system. In step 305, the method allocates to a client a number of virtual blocks for data storage. In step 310, the method sets an estimated number of future write request threshold. With the virtual blocks allocated, for a first time slice the allocation and deallocation of virtual blocks is monitored in step 320. As discussed above, this involves the monitoring of block allocation and deallocation on a per-application basis during the time slice. At the conclusion of step 304, for a given time slice, the system has counted the number of new-block allocations caused by a particular application. These new-block allocations are those that resulted in the new allocation of physical resources.

In step 330, the method determines an estimated number of future write requests. In step 340, the method maintains a record of a number of write requests initiated by each of a plurality of applications. In step 350, the meted calculates a remaining time to exceed all space usage. In step 360, the method provides information to a system administration which includes the remaining time and the number of initiated write requests by identified application.

At the end of the time slice, in step 370 the method calculates a time remaining to exceed the capacity of allocated storage blocks, and in step 380 determines if that time to exceed is greater than the length of the next time slice. If the time to exceed is not greater than the length of the next time slice, then the method transitions to step 390 wherein the method generates and transmits an alert which informs the system administrator of the likelihood the allocated storage blocks will not be sufficient throughout the next time slice. The alert also lists those applications that are currently allocating data most aggressively. These applications may be good candidates for redirecting to other available resources. The information included within the alert, therefore, allows a system administrator to respond effectively and intelligent to the alert.

After generating the alert, the current time slice number is incremented in step 395 and the monitoring procedure repeats.

In order to intelligently generate alerts, the present system monitors resource allocation and deallocation requests during distinct time slices. By analyzing the rate at which allocations are made, where the allocations consume new resources (and which applications are making the new allocations), it is possible to predict when a particular resource will become fully utilized within a particular time frame (and generate alerts based upon that prediction).

Figure 7:
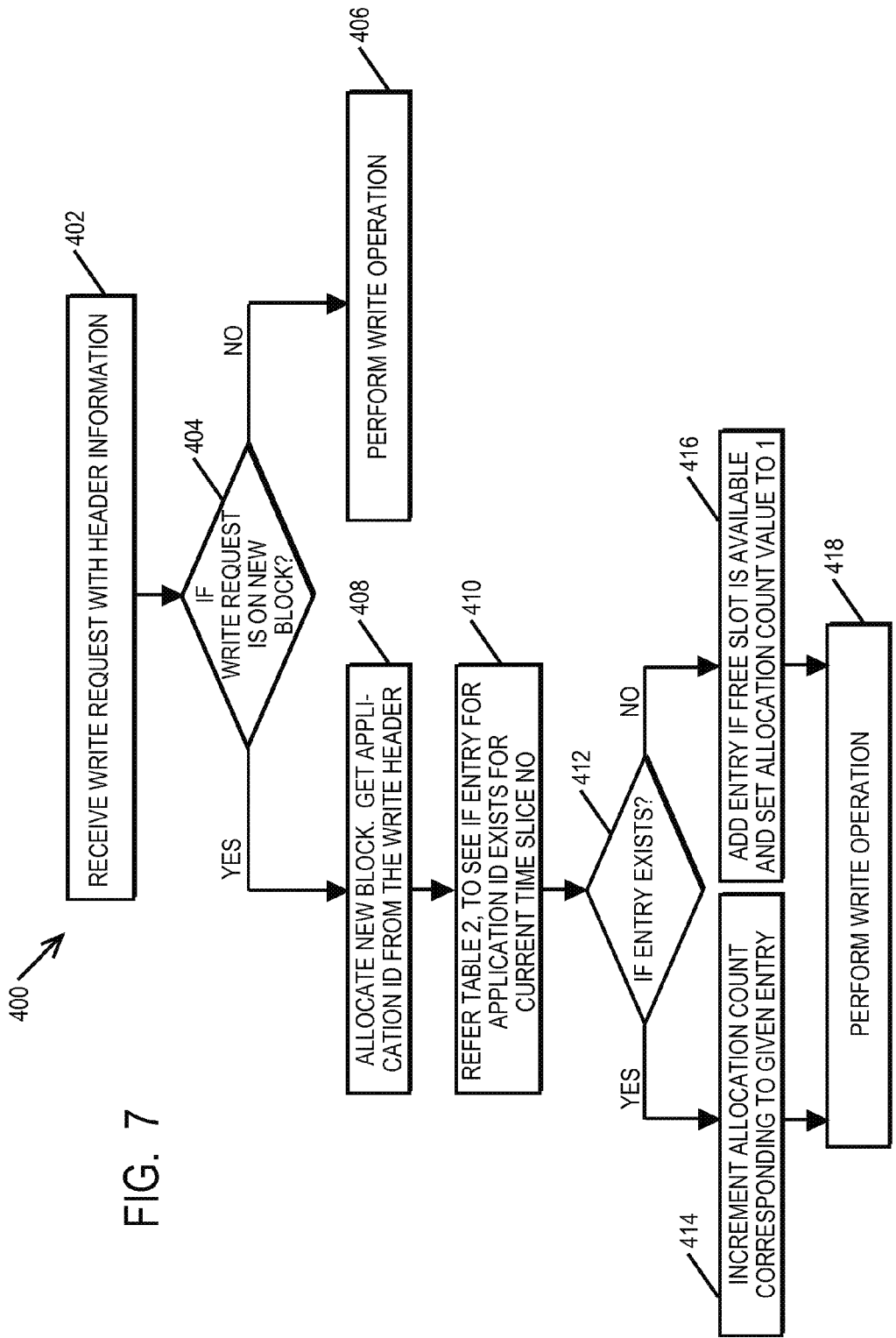
FIG. 7 is a flowchart illustrating a method for monitoring allocation requests during a time slice, where the allocation requests could result in the consumption of new physical resources.

Accordingly, FIG. 7 is a flowchart illustrating method 400 for monitoring allocation requests within the present system during a particular time slice, where the allocation requests could result in the consumption of new physical resources. The method of FIG. 7, therefore, may be implemented in conjunction with step 304 of FIG. 6. In step 402 a request is received to write data. The request includes header information identifying the application generating the request. In step 404, the mapping table (see, for example, Table 1, above) is consulted to determine whether the write instruction will result in the allocation of a new physical block, or whether the write instruction will occur on a physical block that had been previously allocated. If the write operation will occur to a physical block that had been previously allocated, the write operation is performed in step 406 and no further action is taken.

If, however, it is determined that a new physical block must be allocated to successfully perform the write operation, in step 408 the new physical block is allocated and the application ID of the application issuing the write request is retrieved from the write request's header. Then, in step 410 the time slice data table (see, for example, Table 2, above) is consulted to see if an entry exists in the current time slice for the requesting application. If, in step 412, an entry does exist, the allocation count for that application in the current time slice is incremented. Alternatively, if, in step 412 an entry does not exist, in step 416 an entry for the requesting application in the current time slice is created and the allocation count is set to 1. Then, after either of steps 414 and 416 is implemented, the write operation is implemented in step 418.

Figure 8:
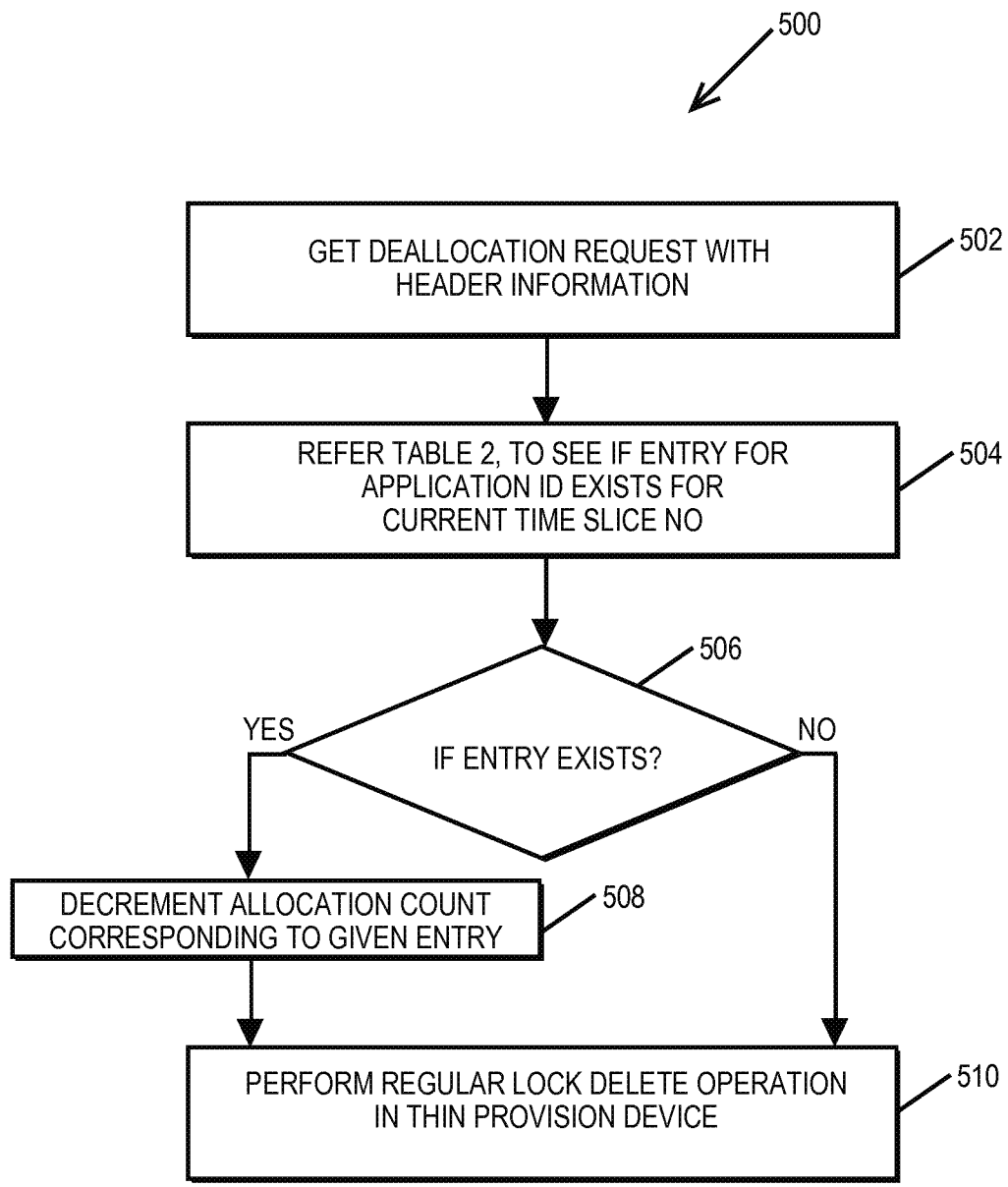
FIG. 8 is a flowchart illustrating a method for monitoring deallocation requests.

Conversely, FIG. 8 is a flowchart illustrating method 500 for monitoring deallocation requests within the present system. The method shown in FIG. 8 may be implemented in conjunction with step 304 of FIG. 3 to allow for the monitoring of deallocation requests issued by one or more applications implemented on a thin client, where the deallocation requests may free up physical resources one implemented. In step 502 a request is received to delete or deallocate data. The request includes header information identifying the application generating the request. In step 504, the time slice data table (see, for example, Table 2, above) is consulted to see if an entry exists in the current time slice for the requesting application. If, in step 506, an entry does exist, the allocation count for that application in the current time slice is decremented by 1 in step 508. Alternatively, if, in step 506 an entry does not exist, no action is taken. Following steps 506 or 508, the normal deallocation process occurs in the step 510.

The methods of FIG. 7 and FIG. 8, therefore, allow the provisioning system to monitor allocation and deallocation requests on a per-application basis during a given time slice. As a resulting of that monitoring, the time slice data table is updated to indicate how many new allocations that consume physical resources have been generated by a number of applications in the current time slice. As described below, this data, once captured, allows for the creation of comprehensive alerts should a particular physical resource be nearing full utilization.

Figure 9:
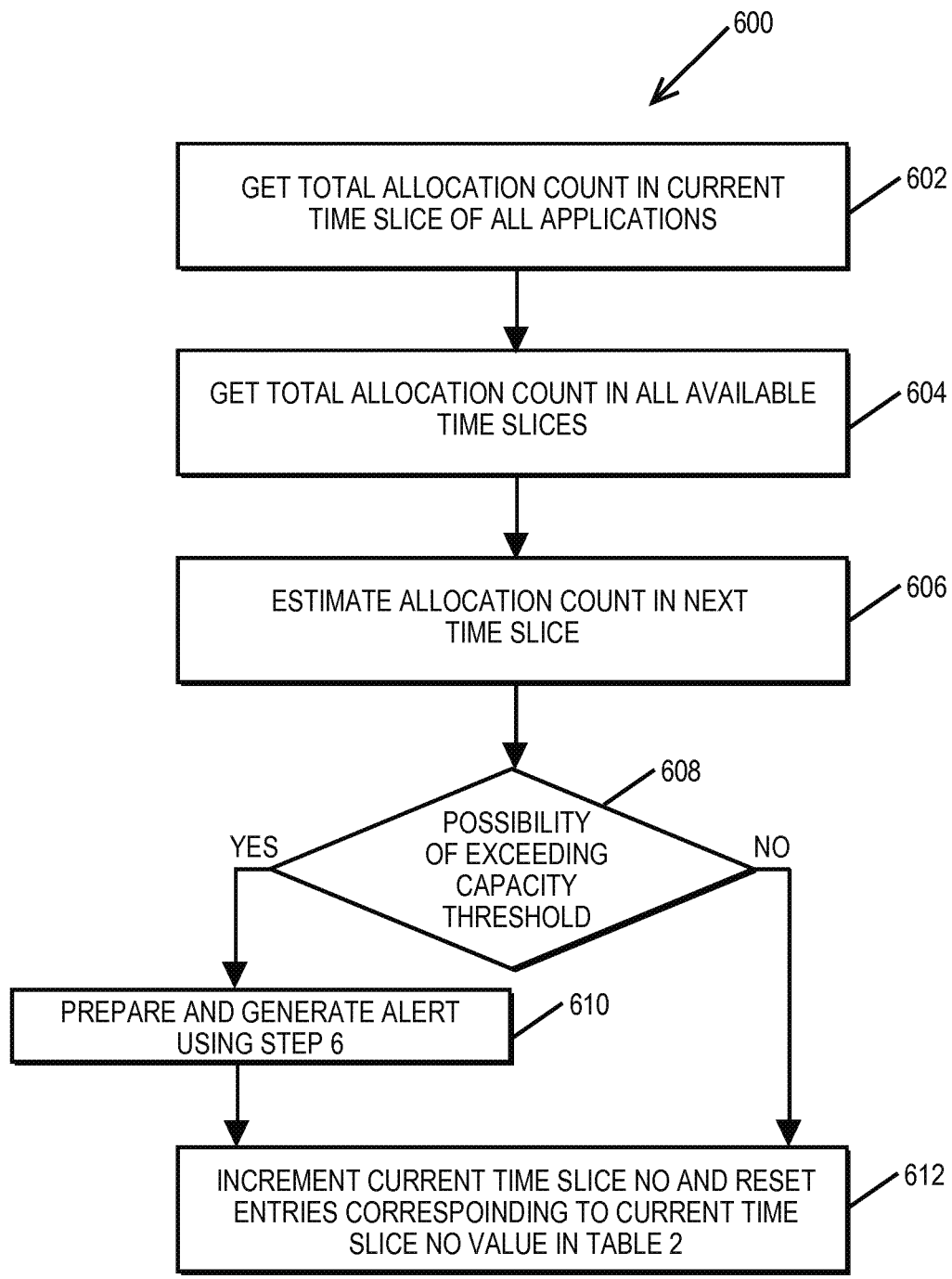
FIG. 9 is a flowchart illustrating a method for analyzing captured time slice data to determine whether an alert is to be transmitted.

FIG. 9 is a flowchart illustrating method 600 for analyzing the captured time slice data to determine whether an alert is necessary. Method 600 also provides for resetting certain data within the time slice data table enabling the capture of new allocation and deallocation data in future time slices. In step 602, the total number of allocations across all applications is determined for the current time slice. In step 604, the total number of allocations across all applications is determined for all available time slices. Note that the number of available time slices will be defined by the MaxTimeSlice variable, described above. In step 606, using the data collected in steps 602 and 604, the total allocation count in the next time slice is estimated. In one implementation, the estimated number of allocations in the next time slice is calculated according to the following formula:

$$\text{Estimated Allocation in Next Time Slice} = \alpha * \text{Total Allocation in Current Time Slice} + (1-\alpha) * \text{Average of Past Allocation Counts} \quad \text{Equation (1)}$$

In Equation (1), $\alpha$ is a system defined parameter and the Average of Past Allocation Counts is calculated by dividing the allocation count across all time slices (identified in step 604) by the total number of time slices in the time slice data table (in most cases this value will be equal to the value of the MaxTimeSlice variable).

In certain embodiments, the parameter $\alpha$ is assigned a value greater than or equal to 0, and less than or equal to 1. If parameter $\alpha$ is set to 0, then an estimated allocation will not be the same as a current allocation. Rather, an estimated allocation will comprise an average of past allocation counts. On the other hand, if parameter $\alpha$ is set to 1, then an estimated allocation will be the same as a current allocation.

In step 608, using the anticipated allocation count of the next time slice, it is determined whether a physical device capacity will be exceeded in the next time slice. If so, in step 610 an alert is generated (see FIG. 10 for an example method to create the alert). After implementation of steps 608 and, if necessary, step 610, the current time slice value is incremented, and the allocation counts for the current time slice are reset in step 612.

Figure 10:
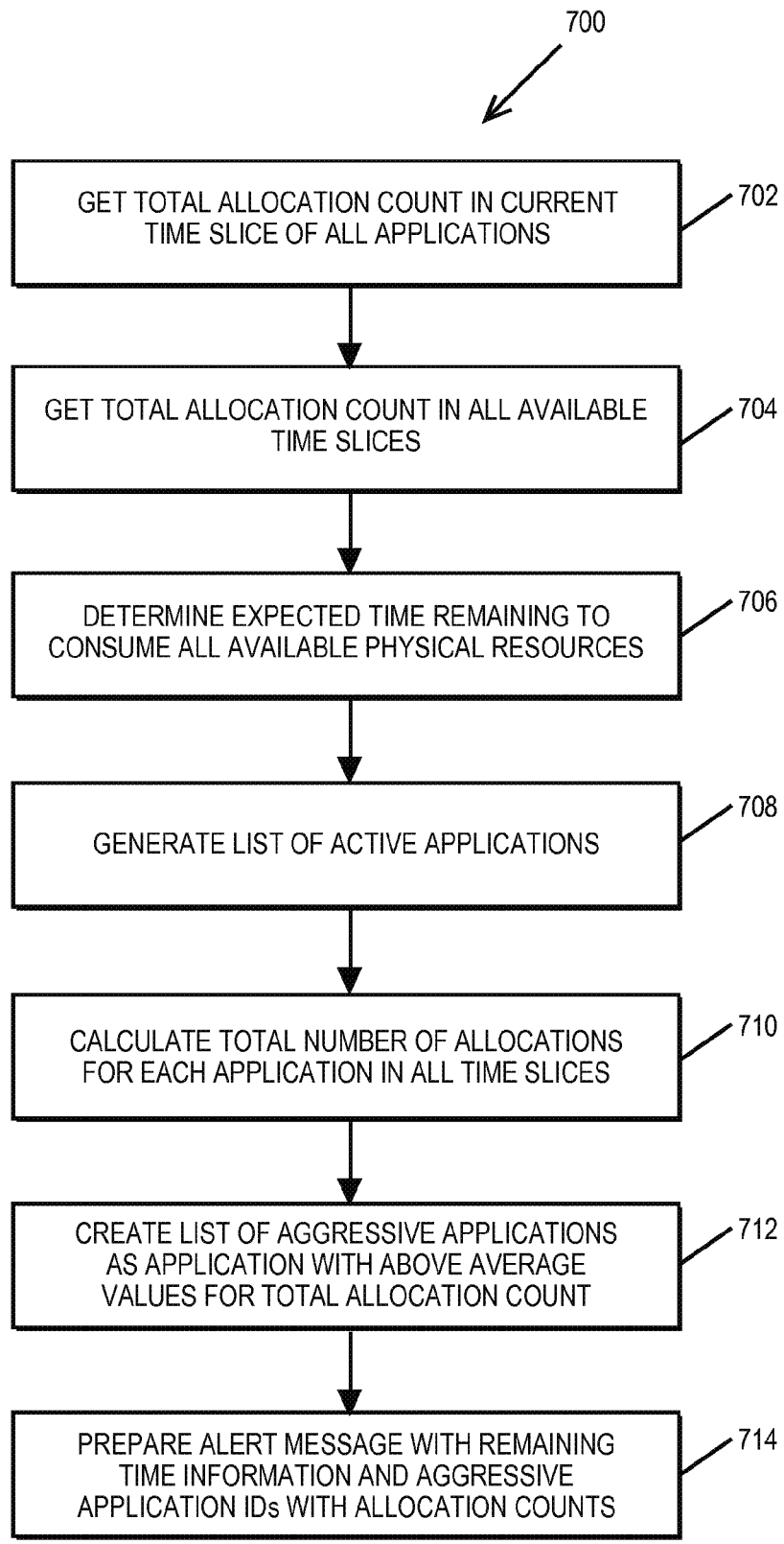
FIG. 10 is a flowchart illustrating a method for generating an alert based upon the consumption of resources.

FIG. 10 is a flowchart illustrating method 700 for generating an alert in accordance with the present disclosure. In step 702, for the current time slice, the total number of new physical resource allocations across all applications is determined for the current time slice (see, for example, Table 2, above). In step 704, the total number of new physical resource allocations across all applications is determined for all available time slices. Note that the maximum number of time slices will be defined by the MaxTimeSlice variable, described above. In step 706, using the data collected in steps 702 and 704 a time remaining before the available physical resources are fully consumed is calculated. In one implementation, the time remaining is calculated according to the following Equation (2):

$$\text{Time Remaining to Consume All Physical Resources} = (\text{\# of Physical Resources Available} * \text{size of Time Slice}) / (\text{Estimated Allocation in Next Time Slice})$$

In Equation (2), the size of Time Slice is a number of seconds, the # of Physical Resources Available is equal to the number of unallocated physical blocks available to the provisioning system and the Estimated Allocation in Next Time Slice is determined using Equation (1), above.

In step 708, a list of currently active applications is generated by identifying a set of unique application IDs for which time slice data has been collected. This may involve, for example, analyzing the time slice data table (see Table 2, above) to identify the set of unique application IDs that appear in the table. With the set of active applications identified, in step 710, for each application, the total number of new allocations across all time slices is calculated. Then, an average number of new allocations for each application per time slice is calculated by dividing the total number of allocations for each application by the number of available time slices.

In step 712, a list of aggressive applications can then be generated by comparing the average number of new allocations per application per time slice to an average value across all applications. The average value of new allocations can be calculated by dividing the total number of new allocations for all time slices by the number of time slices multiplied by the number of unique application IDs. In one implementation, applications that exceed the average number of per-application new allocations can be labeled as 'aggressive' applications; namely applications that are causing large number of new physical resource allocations.

Having identified the aggressive applications, an alert message is generated in step 714. The alert message specifies an estimated remaining amount of time before all physical resources are consumed as well as a listing of the aggressive application IDs and their current allocation counts. This information can then be used by the system administrator to add new physical resources, or to redirect write requests from aggressive applications to other resources.

In certain embodiments, individual steps recited in FIG. 6-10 may be combined, eliminated, or reordered.

In certain embodiments, instructions, such as instructions 298 (FIGS. 2, 3) encoded in computer readable medium 296 (FIGS. 2, 3), wherein those instructions are implemented by a processor, such as processor 294 (FIGS. 2, 3), to perform one or more of the various steps of FIGS. 6-10.

In other embodiments, the invention includes instructions residing in any other computer program product, where those instructions are implemented by a computer external to, or internal to, data storage library 100 (FIG. 3), data storage system 200 (FIG. 2), data storage system 300 (FIG. 3), to perform one or more of the various steps of FIGS. 6-10. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

In certain embodiments, Applicants' method is utilized with a "Tranche Distributed Repository." In these embodiments, Applicants' method references a file by its contents, not by its location. The contents of all files on the repository are hashed, and this hash is used as the token to access the file. Since a hash is based solely on the contents, it also provides a means to verify the integrity of the file. When citing a data set in a manuscript, referencing a data set by its hash means the downloader can be certain that what they are downloading was precisely what was being referenced by the publisher.

In certain embodiments, Applicants' Tranche repository comprises a hybrid model that uses concepts from both the peer-to-peer networks and centralized servers, so it can best be described as a "distributed server model". In certain embodiments, all files are signed by a unique digital certificate associated with the user who uploaded it; every file stored in the repository stores a reference to the associated certificate. This provides the file's provenance, which is a central aspect of the peer-review-centric culture of scientific research.

In certain embodiments, files or data sets can be optionally encrypted. The uploader can set a passphrase, and the data will be encrypted. However, the uploader can then "publish" the passphrase, which will automatically decrypt the files during download. This provides researchers with pre-publication access controls with the option of leaving a data set encrypted indefinitely.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method of managing resource allocations in a storage system provisioning system, comprising:
    monitoring write applications that result in new storage block allocations during a current time slice;
    based upon said monitoring, calculating a time remaining to exceed actual capacity of allocated storage blocks;
    if said calculated remaining time does not exceed length of next time slice, transmitting an alert; and
    if said calculated remaining time does exceed length of next time slice, immediately transmitting an alert when an estimated number of future write requests exceeds a predetermined threshold;
    maintaining a record, during each of a plurality of time slices, of a number of data write requests initiated by each of a plurality of applications;
    calculating a remaining time to exceed all space usage; and
    identifying applications currently requiring allocation of additional storage blocks;
    transmitting information reciting said calculated remaining time and said identified applications;
    wherein the information identifies a listing of applications that have initiated a number of write requests that exceeds the average number of data write requests for each one of the plurality of applications.

2. The method of claim 1, wherein the number of future write requests is estimated using the formula:

$$\alpha*\text{Total Allocation in Current Time Slice}+(1-\alpha)*\text{Average of Past Allocation Counts, where } \alpha \text{ is a system defined parameter.}$$

3. The method of claim 2, wherein $\alpha$ is set to 0, wherein the number of future write requests is set to equal a total allocation in a current time slice.

4. The method of claim 2, wherein $\alpha$ is set to 1, wherein the number of future write requests is set to equal an average of past allocation counts.

5. The method of claim 1, including identifying a second number of data write requests initiated by each one of the plurality of applications that result in a deallocation of physical resources.

6. The method of claim 1, wherein the write requests are issued by clients to the provisioning system.

7. The method of claim 1, wherein a duration of each one of the plurality of time slices is set by a storage system administrator based upon a current storage library setup and a time required to arrange a new storage device when a thin provisioning device is going out of disk space.

8. The method of claim 1, including identifying a second number of virtual block data write requests initiated by each one of a plurality of applications that does not result in an allocation of previously unallocated physical resources.

9. An article of manufacture comprising a processor and a non-transitory data storage medium comprising computer readable program code encoded therein to managing resource allocations in a storage system provisioning system, the computer readable program code comprising a series of computer readable program steps to effect:
    maintaining a record, during each of a plurality of time slices, of a number of virtual block data write requests initiated by each one of a plurality of applications that result in an allocation of previously unallocated physical resources;
    monitoring write applications that result in new storage block allocations during a current time slice;
    based upon said monitoring, calculating a time remaining to exceed actual capacity of allocated storage blocks;

if said calculated remaining time does not exceed length of next time slice, transmitting an alert; and if said calculated remaining time does exceed length of next time slice, immediately transmitting an alert when an estimated number of future write requests exceeds a predetermined threshold;

maintaining a record, during each of a plurality of time slices, of a number of data write requests initiated by each of a plurality of applications;

calculating a remaining time to exceed all space usage; and identifying applications currently requiring allocation of additional storage blocks;

transmitting information reciting said calculated remaining time and said identified applications;

generating information that identifies a listing of applications that have initiated a number of write requests that exceeds the average number of data write requests for each one of the plurality of applications.

10. The article of manufacture of claim 9, said computer readable program code further comprising a series of computer readable program steps to effect estimating the number of future write requests using the formula:

$$\alpha*\text{Total Allocation in Current Time Slice} + (1-\alpha)*\text{Average of Past Allocation Counts, where } \alpha \text{ is a system defined parameter.}$$

11. The article of manufacture of claim 10, said computer readable program code further comprising a series of computer readable program steps to effect setting $\alpha$ to 0, wherein the number of future write requests is set to equal a total allocation in a current time slice.

12. The article of manufacture of claim 10, said computer readable program code further comprising a series of computer readable program steps to effect setting $\alpha$ to 1, wherein the number of future write requests is set to equal an average of past allocation counts.

13. The article of manufacture of claim 9, said computer readable program code further comprising a series of computer readable program steps to effect identifying a second number of data write requests initiated by each one of the plurality of applications that result in a deallocation of physical resources.

14. The article of manufacture of claim 9, said computer readable program code further comprising a series of computer readable program steps to effect issuing write requests by clients to the provisioning system.

15. The article of manufacture of claim 9, wherein a duration of each one of the plurality of time slices is set by a storage system administrator based upon a current storage library setup and a time required to arrange a new storage device when a thin provisioning device is going out of disk space.

16. The article of manufacture of claim 9, said computer readable program code further comprising a series of computer readable program steps to effect identifying a second number of virtual block data write requests initiated by each one of a plurality of applications that does not result in an allocation of previously unallocated physical resources.

17. A storage provisioning system comprising a processor, a non-transitory data storage medium comprising computer readable program code encoded therein to managing resource allocations, and a tranche distributed repository wherein the contents of all files on the repository are hashed, and a unique hash is used as a token to access each file, the computer readable program code comprising a series of computer readable program steps to effect:

maintaining a record, during each of a plurality of time slices, of a number of virtual block data write requests initiated by each one of a plurality of applications that result in an allocation of previously unallocated physical resources;

monitoring write applications that result in new storage block allocations during a current time slice;

based upon said monitoring, calculating a time remaining to exceed actual capacity of allocated storage blocks;

if said calculated remaining time does not exceed length of next time slice, transmitting an alert; and if said calculated remaining time does exceed length of next time slice, immediately transmitting an alert when an estimated number of future write requests exceeds a predetermined threshold maintaining a record, during each of a plurality of time slices, of a number of data write requests initiated by each of a plurality of applications;

calculating a remaining time to exceed all space usage; and identifying applications currently requiring allocation of additional storage blocks;

transmitting information reciting said calculated remaining time and said identified applications;

generating information that identifies a listing of applications that have initiated a number of write requests that exceeds the average number of data write requests for each one of the plurality of applications.

18. The storage provisioning system of claim 17, said computer readable program code further comprising a series of computer readable program steps to effect estimating the number of future write requests using the formula:

$$\alpha*\text{Total Allocation in Current Time Slice} + (1-\alpha)*\text{Average of Past Allocation Counts, where } \alpha \text{ is a system defined parameter.}$$

19. The storage provisioning system of claim 18, said computer readable program code further comprising a series of computer readable program steps to effect setting $\alpha$ to 0, wherein the number of future write requests is set to equal a total allocation in a current time slice.

20. The storage provisioning system of claim 18, said computer readable program code further comprising a series of computer readable program steps to effect setting $\alpha$ to 1, wherein the number of future write requests is set to equal an average of past allocation counts.

21. The storage provisioning system of claim 17, said computer readable program code further comprising a series of computer readable program steps to effect identifying a second number of data write requests initiated by each one of the plurality of applications that result in a deallocation of physical resources.

22. The storage provisioning system of claim 17, said computer readable program code further comprising a series of computer readable program steps to effect issuing write requests by clients to the provisioning system.

23. The storage provisioning system of claim 17, wherein a duration of each one of the plurality of time slices is set by a storage system administrator based upon a current storage library setup and a time required to arrange a new storage device when a thin provisioning device is going out of disk space.

24. The storage provisioning system of claim 17, said computer readable program code further comprising a series of computer readable program steps to effect identifying a second number of virtual block data write requests initiated by each one of a plurality of applications that does not result in an allocation of previously unallocated physical resources.

* * * * *